(12) United States Patent
Takashima

(10) Patent No.: US 9,041,814 B2
(45) Date of Patent: May 26, 2015

(54) AUTOMATIC TRACKING CAMERA SYSTEM

(71) Applicant: CANON KABUSHIKI KAISHA, Tokyo (JP)

(72) Inventor: Yuji Takashima, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 392 days.

(21) Appl. No.: 13/676,285

(22) Filed: Nov. 14, 2012

(65) Prior Publication Data

US 2013/0120586 A1 May 16, 2013

(30) Foreign Application Priority Data

Nov. 15, 2011 (JP) ................................. 2011-249929

(51) Int. Cl.
*H04N 5/225* (2006.01)
*H04N 5/232* (2006.01)

(52) U.S. Cl.
CPC .............. *H04N 5/225* (2013.01); *H04N 5/232* (2013.01)

(58) Field of Classification Search
USPC ............. 348/169, 155, 154, 143, 116, 95, 67, 348/50, 49, 37, 208.3, 208.11, 208.14, 348/208.99, 211.4, 220.1, 222.1, 202, 267, 348/333.02, 333.06, 352, 360, 361, 362, 348/402.1, 407.1, 413.1, 416.1, 431.1, 451, 348/452, 511, 583, 647, 699, 705
See application file for complete search history.

(56) References Cited

U.S. PATENT DOCUMENTS

| 2007/0177052 | A1* | 8/2007 | Yamamoto ..................... 348/375 |
| 2007/0200933 | A1* | 8/2007 | Watanabe et al. ......... 348/211.11 |
| 2008/0110970 | A1* | 5/2008 | Kataoka et al. ............... 235/375 |
| 2009/0059060 | A1* | 3/2009 | Mukai et al. .................. 348/347 |
| 2009/0252374 | A1* | 10/2009 | Ishikawa et al. .............. 382/103 |
| 2010/0188577 | A1* | 7/2010 | Jing et al. ...................... 348/559 |

FOREIGN PATENT DOCUMENTS

| JP | 8-074296 A | 3/1996 |
| JP | 2003-060972 A | 2/2003 |

* cited by examiner

*Primary Examiner* — Jefferey Harold
*Assistant Examiner* — Mustafizur Rahman
(74) *Attorney, Agent, or Firm* — Rossi, Kimms & McDowell LLP

(57) ABSTRACT

An automatic tracking camera system includes: a rotating unit for panning and tilting an image pickup unit including a lens apparatus and an image pickup apparatus; a tracking object detector; a motion vector detector for detecting a motion vector of the object to be tracked; a capture position setting unit for setting a capture position of the object to be tracked in the picked up image; and a controller for controlling drive of the rotating unit. The controller controls the rotating unit in a capture mode to capture the object to be tracked at the capture position based on the motion vector detected by the motion vector detector after the tracking object detector has detected the object to be tracked in the picked up image, and a maintenance mode to continuously capture the object to be tracked at the capture position after the capture mode.

5 Claims, 3 Drawing Sheets

TILTING CONTROL
(SPEED: Vt)

AUTOMATIC TRACKING CAMERA SYSTEM

BACKGROUND OF THE INVENTION

1. Field of the Invention

The present invention relates to an automatic tracking camera system for automatically tracking an object to be tracked by recognizing the object to be tracked in a picked up image through image recognition.

2. Description of the Related Art

A camera including an electric camera platform capable of performing a rotating operation such as panning and tilting has an operation apparatus connected thereto through a cable or wireless communication so that the camera and the camera platform can be controlled in a remote place. An operator operates the operation apparatus while viewing an image displayed on a monitor screen, to thereby control the camera and the electric camera platform.

In recent years, there has been proposed an automatic tracking camera system for automatically tracking an object through use of an image recognition technology provided to the camera including the camera platform.

Conventionally, in such a system as described above, it has been necessary to preset, before the automatic tracking, a position on the screen at which the object to be tracked is to be displayed. This position is set by the following methods. According to the disclosure of Japanese Patent Application Laid-Open No. H08-074296, the operator uses the operation apparatus to set the position of the object to be tracked on the screen, and at the time of automatic tracking, the operator controls the camera platform so that the object is relatively stopped at the position on the screen. According to the disclosure of Japanese Patent Application Laid-Open No. 2003-060972, the camera platform is rotated so that the object is stopped at a specific position on the screen of the picked up image after reaching this specific position.

However, in the above-mentioned conventional technology disclosed in Japanese Patent Application Laid-Open No. H08-074296, at the time of automatic tracking, if an actual position of the object on the screen is separated from a position on the screen that is set as the position at which the object to be tracked is to be displayed, a panning/tilting apparatus is driven and controlled so that the object to be tracked is immediately displayed at the set position, and hence a significant change may occur in the image. In the conventional technology disclosed in Japanese Patent Application Laid-Open No. 2003-060972, the automatic tracking control is not performed until the object to be tracked reaches the position that is preset on the screen, and hence the significant change does not occur in the image. However, this technology does not involve the control for moving the object to be tracked to the set position, and hence there is a problem in that the automatic tracking cannot be started when the object to be tracked has not passed through the predetermined set position.

SUMMARY OF THE INVENTION

The present invention provides an automatic tracking camera system configured so that, even in a case where a position of an object to be tracked is different from a predetermined position (tracking position) preset on a screen when the object to be tracked has appeared in a picked up image, the object to be tracked can be tracked at the predetermined tracking position on the screen of an image with an alleviated feeling of inconvenience, which may be evoked due to a significant change occurring in the picked up image when a camera is rotated so as to pick up an image of the object to be tracked at the predetermined tracking position.

According to an exemplary embodiment of the present invention, An automatic tracking camera system, includes: an image pickup unit including a lens apparatus and an image pickup apparatus; a rotating unit for rotating the image pickup unit in a panning direction and a tilting direction; a tracking object detector for detecting an object to be tracked in an image, which is picked up by the image pickup unit; a motion vector detector for detecting a motion vector of the object to be tracked; a capture position setting unit for setting a capture position in the picked up image, at which the object to be tracked is captured; and a controller for controlling drive of the rotating unit, in which the controller is capable of switching a capture mode, in which the rotating unit is controlled to capture the object to be tracked at the capture position after the tracking object detector has detected the object to be tracked in the picked up image, and a maintenance mode, in which the rotating unit is controlled to continuously capture the object to be tracked at the capture position after the object to be tracked is captured at the capture position through control in the capture mode, and in which, the controller avoids, in the capture mode, rotating the image pickup unit in a direction opposite to a direction of a primary motion vector which has a larger magnitude between a component in the panning direction and a component in the tilting direction of the motion vector.

According to the automatic tracking camera system of the present invention, even in the case where the position of the object to be tracked is different from the predetermined position (tracking position) preset on the screen when the object to be tracked has appeared in the picked up image, the object to be tracked can be tracked at the predetermined tracking position on the screen of the image with an alleviated feeling of inconvenience, which may be evoked due to a significant change occurring in the picked up image when the camera is rotated so as to pick up the image of the object to be tracked at the predetermined tracking position.

Further features of the present invention will become apparent from the following description of exemplary embodiments with reference to the attached drawings.

DESCRIPTION OF THE EMBODIMENTS

In the following, an automatic tracking camera system according to exemplary embodiments of the present invention is described in detail with reference to the attached drawings.

First Embodiment

Figure 1:
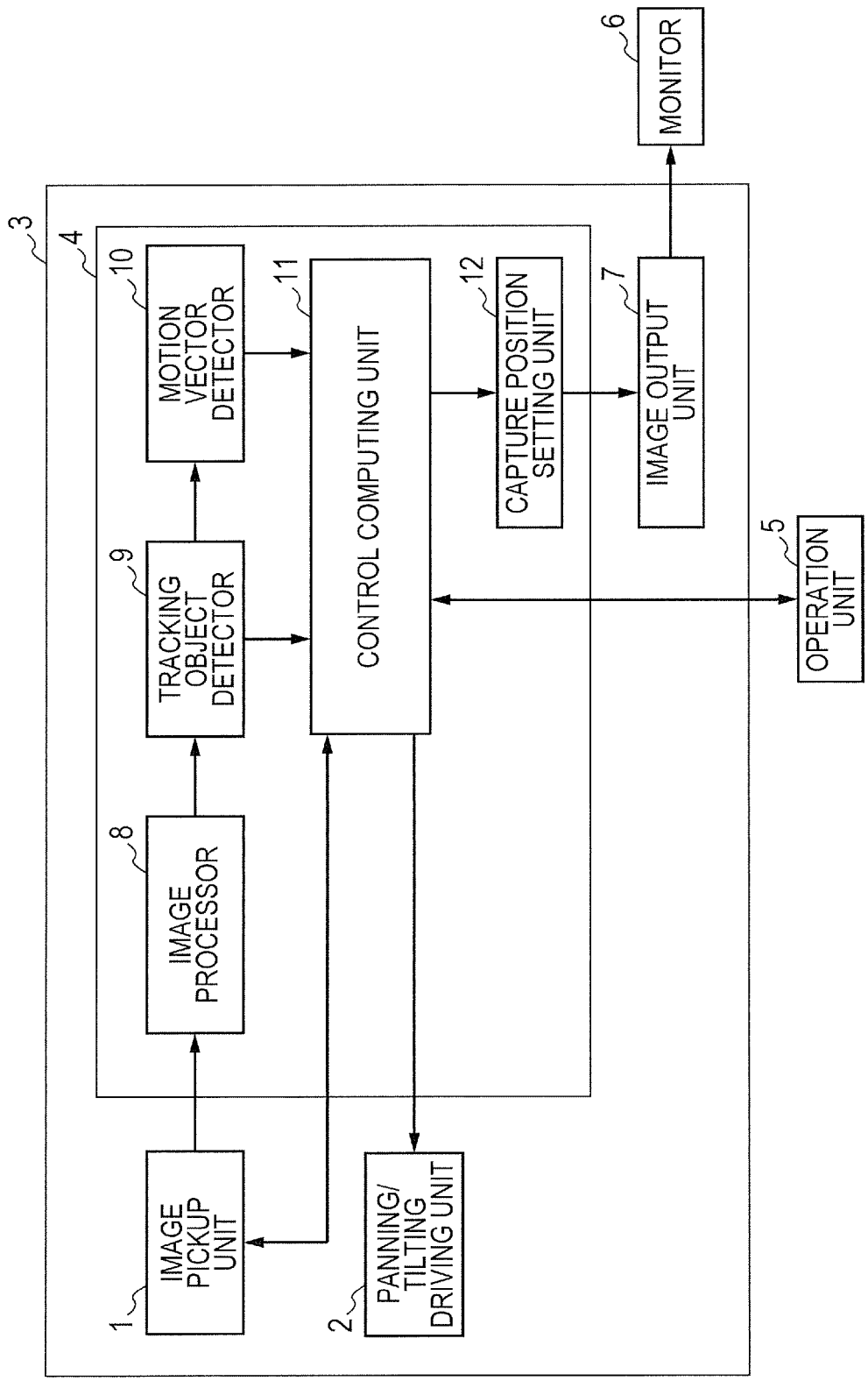
FIG. 1 is a configuration diagram of a first embodiment of the present invention.

FIG. 1 is a configuration diagram of an automatic tracking camera system according to a first embodiment of the present invention. To a camera platform 3, an operation unit 5 for operating the camera platform 3, and a monitor 6 for checking an image which is picked up by a camera. The camera platform 3 includes an image pickup unit 1 including a lens apparatus having zooming and focusing functions and the like, and an image pickup apparatus for picking up object light from the lens apparatus, are connected. Based on an operation performed by an operator, a command signal is transmitted from the operation unit 5 to a CPU 4 of the camera platform 3. The CPU 4 outputs a command signal for panning and tilting rotation to a panning/tilting driving unit 2 serving as a rotating unit so as to rotate the camera platform 3 (image pickup unit 1) in a panning direction and a tilting direction, and outputs a command signal for a camera function to the image pickup unit 1 so as to adjust the camera function such as zooming and focusing.

An image signal output from the image pickup unit 1 is input to an image processor 8 of the CPU 4, and when the input image signal is an analog signal, the image processor 8 converts the analog signal into a digital signal. The processing signal adjusted in contrast, color phase, and chromaticness of the image by the image processor 8 is input to a tracking object detector 9 for detecting an object to be tracked.

When the output image signal from the image processor 8 contains an image of the object to be tracked, the tracking object detector 9 recognizes the object to be tracked and detects a position of the object to be tracked on a screen through use of an image recognition technology such as template matching. The output from the tracking object detector 9 is input to a motion vector detector 10 for detecting a movement direction and movement speed (motion vector) of the object to be tracked, that is, a movement speed in the panning direction and the tilting direction. Information on the object to be tracked that is detected by the tracking object detector 9 and information on the motion vector of the object to be tracked that is detected by the motion vector detector 10 are input to a control computing unit 11 serving as a controller.

Figure 2:
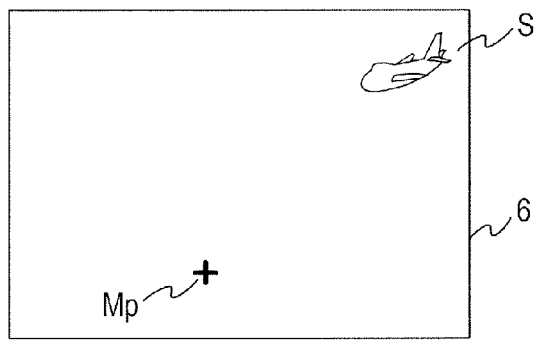
FIG. 2 is a diagram of a monitor screen showing an object to be tracked and a tracking position.

A capture position setting unit 12 for setting a capture position in the picked up image, at which the object to be tracked is captured, sets a tracking mark Mp as illustrated in FIG. 2, for indicating a position on the screen of the monitor 6 at which the object to be tracked is tracked while being displayed in a stationary manner. An image signal obtained by combining an image of the tracking mark Mp with a picked up image containing an object S to be tracked is input to an image output unit 7. The phrase "capture the object to be tracked" herein refers to an operation of picking up an image of the object to be tracked at a predetermined position (within a predetermined region) set in the picked up image (on the screen of the picked up image). The image output unit 7 outputs, to the monitor 6, an image signal which is converted conforming to an image input format of the monitor 6, such as SDI, DVI, VGA, and NTSC. In the example of FIG. 2, the tracking mark Mp is constantly displayed on the monitor 6, but may alternatively be displayed only at the time of setting.

Figure 3:
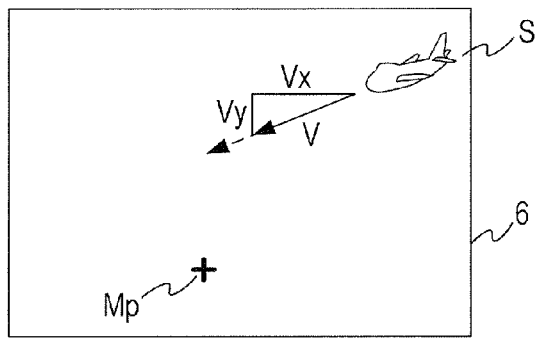
FIG. 3 is a diagram of a motion vector of the object to be tracked and the tracking position.

Next, a tracking operation of the control computing unit 11 is described with reference to FIG. 3 as an example. FIG. 3 is a diagram illustrating a state in which the object S to be tracked has appeared on the screen of the picked up image, and a motion vector of the object S to be tracked on the screen in addition to the image displayed on the monitor 6 with the tracking mark Mp set by the capture position setting unit 12.

When the object S to be tracked has appeared on the screen, the tracking object detector 9 determines whether or not the object S is the object to be tracked. When the object S is the object to be tracked, the tracking object detector 9 detects the position of the object S to be tracked on the screen, and the motion vector detector 10 detects a speed vector V on the screen and speed components Vx and Vy of the speed vector V corresponding to the panning direction and the tilting direction, respectively. Based on the position of the object S to be tracked, which is detected by the tracking object detector 9, the speed components Vx and Vy in the panning and tilting directions (motion vectors in the panning direction and the tilting direction), which are determined by the motion vector detector 10, the position of the tracking mark Mp (capture position), which is set by the capture position setting unit 12, and information on an angle of view of the image pickup unit 1, the control computing unit 11 determines a rotation direction and a rotation speed for controlling the panning/tilting driving unit 2 to rotate the image pickup unit 1, and performs control for outputting a drive signal to the panning/tilting driving unit 2 so as to display the object S to be tracked at the position of the tracking mark Mp on the screen (hereinafter referred to as "control in a capture mode").

Figure 4A:
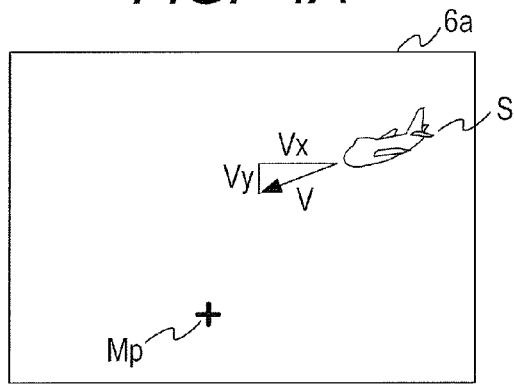
FIG. 4A is an explanatory diagram illustrating a tracking state according to the first embodiment.
Figure 4B:
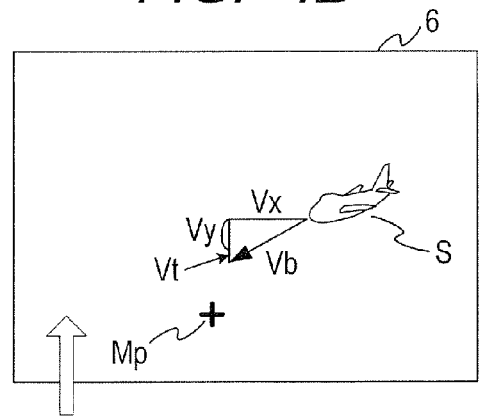
FIG. 4B is an explanatory diagram illustrating the tracking state according to the first embodiment.

FIGS. 4A and 4B are diagrams illustrating motion vectors of the object S to be tracked on the screen in addition to an image on a monitor 6a before the rotation control (FIG. 4A) and an image on the monitor 6 during the rotation control (FIG. 4B), respectively, at the time of rotating the image pickup unit 1 upward only in the tilting direction so as to capture the object S to be tracked at the position of the tracking mark Mp. In the example of FIGS. 4A and 4B, in order to display the object S to be tracked at the position of the set tracking mark Mp, the image pickup unit 1 is rotated at a speed Vt in a direction (in FIG. 4B, upward direction) opposite to that of the speed component of the object S to be tracked in the tilting direction. The obtained image shows a state in which the object S to be tracked reaches the tracking mark Mp while moving on the screen in the leftward direction at a speed corresponding to the speed component Vx in the panning direction, and moving on the screen in the tilting direction (in FIGS. 4A and 4B, downward direction of the screen) at a speed corresponding to a sum of the speed component Vy in the tilting direction and the rotation speed Vt of the image pickup unit 1 rotated by the panning/tilting driving unit 2.

Figure 5A:
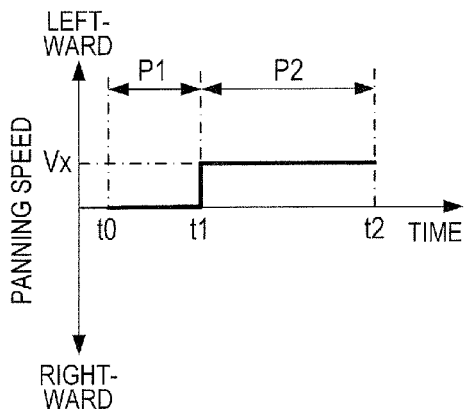
FIG. 5A is a chart illustrating a temporal change of a panning speed according to the first embodiment.
Figure 5B:
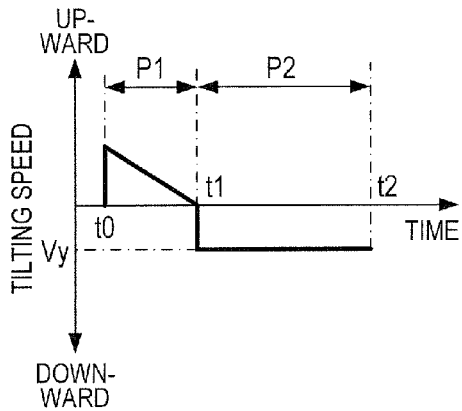
FIG. 5B is a chart illustrating a temporal change of a tilting speed according to the first embodiment.

FIGS. 5A and 5B illustrate temporal changes of the rotation speeds of the panning and tilting drive at this time, respectively. In FIGS. 5A and 5B, a period P1 refers to a period in which control is performed so as to capture the object S to be tracked at the position of the tracking mark Mp on the screen. A period P2 refers to a period in which the panning/tilting driving unit 2 is controlled in the capture mode to display the object S to be tracked at the position of the tracking mark Mp, and is then controlled so as to continuously display the object S to be tracked while being relatively stopped at the tracking mark Mp (hereinafter referred to as "control in a maintenance mode").

After the object S to be tracked has reached the tracking mark Mp through the control in the capture mode, the control computing unit 11 switches to the control in the maintenance mode, and in consideration of the angle of view of the image pickup unit 1, controls the panning/tilting driving unit 2 to rotate the image pickup unit 1 at the same speeds Vx and Vy and in the same direction as those of the speed components of the object S to be tracked in the panning and tilting directions (motion vectors in the panning direction and the tilting direction). As a result, there can be obtained a tracking image in which the object S to be tracked is relatively stopped at the position of the tracking mark Mp.

In this embodiment, the image pickup unit 1 is controlled to rotate only in the tilting direction so that the object S to be tracked reaches the tracking mark Mp. Alternatively, the image pickup unit 1 may be controlled to rotate only in the panning direction or both in the panning and tilting directions in accordance with the traveling direction and speed of the object S to be tracked so that the object S to be tracked reaches the tracking mark Mp.

Further, in the example of FIG. 5B, in the control in the capture mode in which the panning/tilting driving unit 2 is driven to rotate the image pickup unit 1 in the tilting direction, the rotation speed is gradually reduced in a period from a time t0 to a time t1. Such control is performed so as to prevent sudden reversing of the driving direction by the panning/tilting driving unit 2 and to change the picked up image smoothly when the object to be tracked is captured at the position of the tracking mark Mp and then the mode shifts to the maintenance mode. However, the present invention is not limited thereto, and the rotation speed during the capture mode may be constant or changed as appropriate.

Second Embodiment

In the following, a tracking operation of the control computing unit 11 in an automatic tracking camera system according to a second embodiment of the present invention is described. The automatic tracking camera system of this embodiment has the same configuration as that illustrated in FIG. 1, and the method of recognizing the object S to be tracked and the method of detecting the speed thereof are also similar to those in the first embodiment.

Figure 6A:
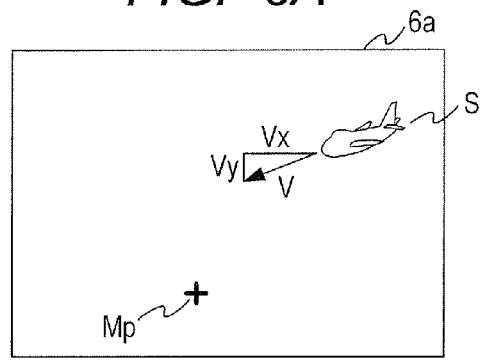
FIG. 6A is an explanatory diagram illustrating a tracking state according to a second embodiment of the present invention.
Figure 6B:
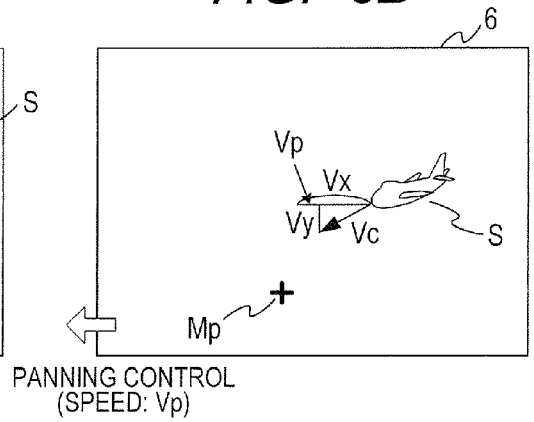
FIG. 6B is an explanatory diagram illustrating the tracking state according to the second embodiment.

FIGS. 6A and 6B are diagrams illustrating motion vectors of the object S to be tracked on the screen in addition to an image on the monitor 6a before the rotation control (FIG. 6A) and an image on the monitor 6 during the rotation control (FIG. 6B), respectively, at the time of performing leftward rotation control of the image pickup unit 1 only in the panning direction so as to capture the object S to be tracked at the position of the tracking mark Mp. In this embodiment, the control computing unit 11 performs rotation control in the panning and tilting directions during the capture mode so that the rotation directions of the panning and tilting are not reversed between the period P1 (FIGS. 7A and 7B), in which the rotation control is performed so that the object S to be tracked is captured at the position of the tracking mark Mp (period during the control in the capture mode), and the period P2 (FIGS. 7A and 7B), in which the rotation control is performed so that the object S to be tracked is relatively stopped at the tracking mark Mp after reaching the tracking mark Mp (period during the control in the maintenance mode). Specifically, the control computing unit 11 performs the rotation control so that the panning and tilting speed directions of the object S to be tracked, which are detected by the motion vector detector 10, match with the rotation directions of the panning and tilting in the period P1 in which the rotation control is performed so that the object to be tracked reaches the tracking mark Mp.

Figure 7A:
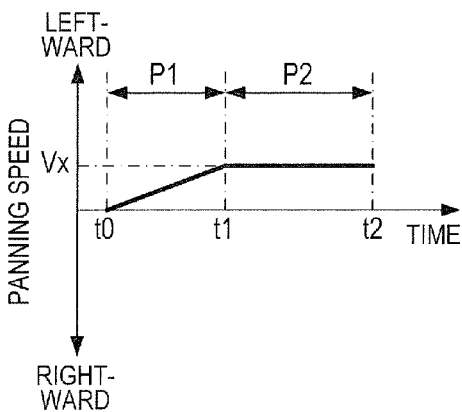
FIG. 7A is a chart illustrating a temporal change of the panning speed according to the second embodiment.
Figure 7B:
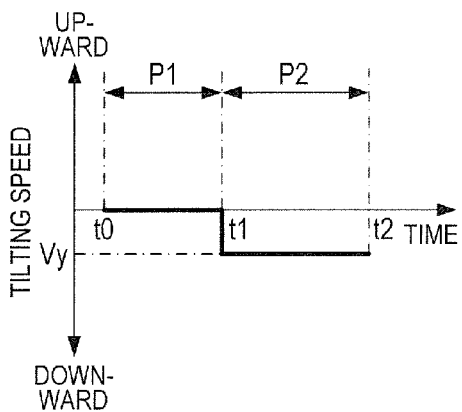
FIG. 7B is a chart illustrating a temporal change of the tilting speed according to the second embodiment.

In the example of FIG. 7A, the image pickup unit 1 is rotated at the speed Vp in the panning direction, that is, in the same direction as that of the speed component of the object S to be tracked in the panning direction (in FIG. 6B, leftward direction), and accordingly the object S to be tracked travels on the screen in the leftward direction at a speed obtained by subtracting the panning speed Vp from the speed component Vx in the panning direction. As for the tilting direction, the obtained image shows a state in which the object S to be tracked reaches the tracking mark Mp while traveling in the downward direction at a speed corresponding to the speed component Vy in the tilting direction. After the object S to be tracked has reached the tracking mark Mp, the panning/tilting driving unit 2 is controlled to rotate the image pickup unit 1 at the same speeds Vx and Vy and in the same direction as those of the speed components of the object S to be tracked in the panning and tilting directions (motion vectors in the panning direction and the tilting direction). As a result, there can be output a tracking image in which the object S to be tracked is relatively stopped at the position of the tracking mark Mp.

The direction in which the object S to be tracked reaches the tracking mark Mp is the same as that in the first embodiment, but the period P1, in which the control is performed so that the object S to be tracked reaches the tracking mark Mp, becomes longer than that in the first embodiment. However, when the control method shifts from the capture mode to the maintenance mode, the rotation directions of the panning and tilting are not reversed, and hence the background image of the object S to be tracked before and after the shift to the maintenance mode transitions in the same direction, resulting in a smooth tracking image with a smaller change amount thereof.

Assuming that the motion vector obtained by the motion vector detector 10 is decomposed into a component in the panning direction and a component in the tilting direction and a component having a higher magnitude is set as a primary motion vector, the control computing unit 11 serving as the controller may control, in the capture mode, the image pickup unit 1 so as not to rotate in a direction opposite to a direction of the primary motion vector. That is, the panning/tilting driving unit 2 is controlled so that the rotation direction is not reversed for one of the panning and tilting directions corresponding to the primary motion vector instead of both the panning and tilting directions. With this configuration, it is possible to avoid the operation of reversing at least a rotation direction of a greater motion in the stage in which the object to be tracked is captured at the capture position in the picked up image, and to provide a tracking image with an alleviated feeling of inconvenience.

Further, in the example of FIG. 7A, in the control in the capture mode in which the panning/tilting driving unit 2 is driven to rotate the image pickup unit 1 in the panning direction, the rotation speed is gradually increased in a period from the time t0 to the time t1, and when the mode shifts to the maintenance mode, the rotation speed is set corresponding to the speed component of the object to be tracked in the panning direction that is obtained by the motion vector detector 10. Such control is performed so as to change the picked up image more smoothly when the object to be tracked is captured at the position of the tracking mark Mp and then the mode shifts to the maintenance mode. However, as for the rotation speed during the capture mode, the present invention is not limited thereto, and the rotation speed during the capture mode may be constant or changed as appropriate.

Note that, in the present invention, the timing at which the object S to be tracked is captured at the position of the tracking mark Mp is not limited to the timing which is synchronized between the panning direction and the tilting direction. Alternatively, the object S to be tracked may be captured at the position of the tracking mark Mp (position in the panning direction and the tilting direction) at timings which are different between the panning direction and the tilting direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-249929, filed Nov. 15, 2011, which is hereby incorporated by reference herein in its entirety.

What is claimed is:

1. An automatic tracking camera system, comprising:
   an image pickup unit comprising a lens apparatus and an image pickup apparatus;
   a rotating unit for rotating the image pickup unit in a panning direction and a tilting direction;
   a tracking object detector for detecting an object to be tracked in an image, which is picked up by the image pickup unit;
   a motion vector detector for detecting a motion vector of the object to be tracked;
   a capture position setting unit for setting a capture position in the picked up image, at which the object to be tracked is captured; and
   a controller for controlling drive of the rotating unit,
   wherein the controller is capable of switching a capture mode, in which the rotating unit is controlled to capture the object to be tracked at the capture position after the tracking object detector has detected the object to be tracked in the picked up image, and a maintenance mode, in which the rotating unit is controlled to continuously capture the object to be tracked at the capture position after the object to be tracked is captured at the capture position through control in the capture mode, and
   wherein, the controller avoids, in the capture mode, rotating the image pickup unit in a direction opposite to a direction of a primary motion vector which has a larger magnitude between a component in the panning direction and a component in the tilting direction of the motion vector.

2. The automatic tracking camera system according to claim 1, wherein, in the capture mode, the controller controls the rotating unit to capture the object to be tracked at the capture position based on a position of the object to be tracked in the picked up image, which is detected by the tracking object detector, the motion vector detected by the motion vector detector, and an angle of view of the image pickup unit.

3. The automatic tracking camera system according to claim 1, wherein, in the maintenance mode, the controller controls the rotating unit to capture the object to be tracked at the capture position based on the motion vector detected by the motion vector detector and an angle of view of the image pickup unit.

4. The automatic tracking camera system according to claim 1, wherein, in the capture mode, the controller controls the rotating unit to rotate the image pickup unit in one of the panning direction and the tilting direction.

5. The automatic tracking camera system according to claim 1, wherein the controller controls the rotating unit to rotate the image pickup unit so that, for each of the panning direction and the tilting direction, a rotation direction avoids being reversed between in the capture mode and in the maintenance mode.

* * * * *